UNITED STATES PATENT OFFICE.

MARK M. SHIELDS, OF REPUBLIC, WASHINGTON.

TRAP.

1,340,801.  Specification of Letters Patent.  Patented May 18, 1920.

Application filed July 12, 1919. Serial No. 310,322.

*To all whom it may concern:*

Be it known that I, MARK M. SHIELDS, a citizen of the United States, residing at Republic, in the county of Ferry and State of Washington, have invented new and useful Improvements in Traps, of which the following is a specification.

This invention comprehends the provision of a self and ever-set rat trap, wherein use is made of a pivoted platform arranged within a receptacle for controlling communication between the receptacle and a cage in which the animal is trapped, a pivoted gate having associated therewith a resilient element which is operated with the platform, to hold the latter in its tripped position, until the gate is fully opened by the animal wherein said platform is released to gravitate to its normal position.

The nature and advantages of the invention will be better understood when the following detailed description is taken in connection with the accompanying drawings, the invention residing in the construction, combination and arrangement of parts as claimed.

In the drawings forming part of this specification, like numerals of reference indicate similar parts in the several views, and wherein:—

Figure 1:
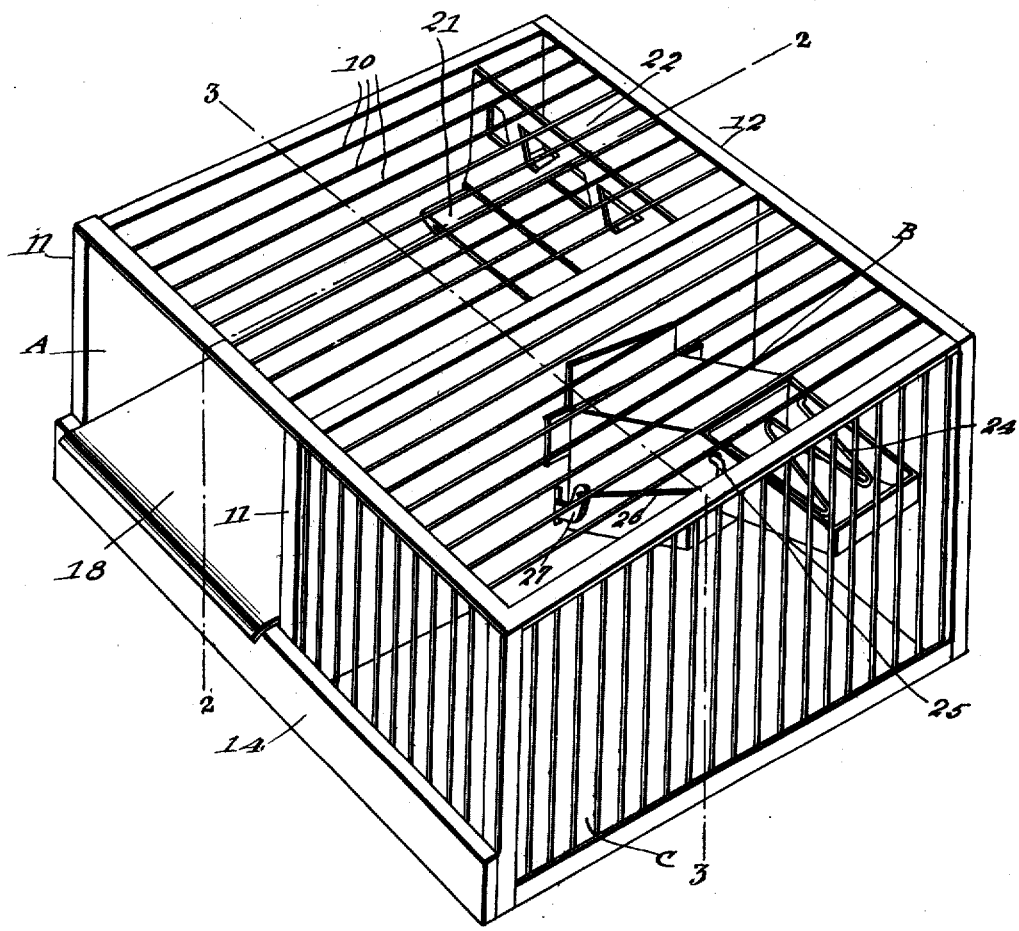
Figure 1 is a perspective view of the device forming the subject matter of my invention.
Figure 2:
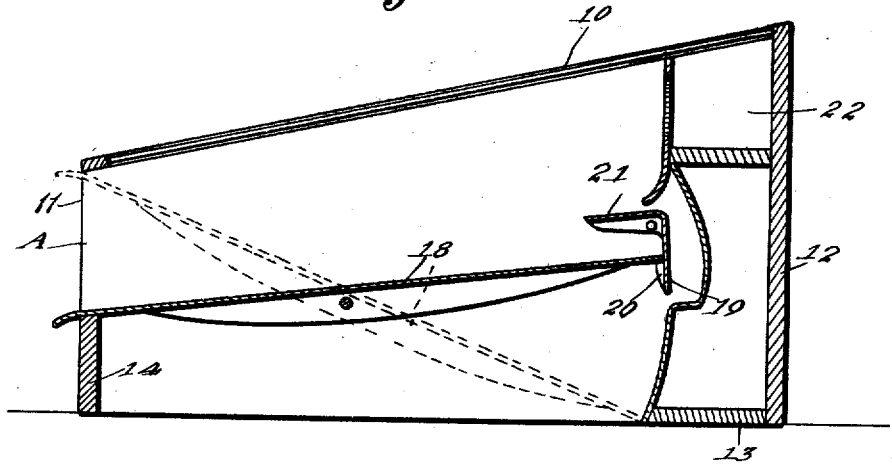
Fig. 2 is a longitudinal sectional view taken through the receptacle on line 2—2 of Fig. 1.
Figure 3:
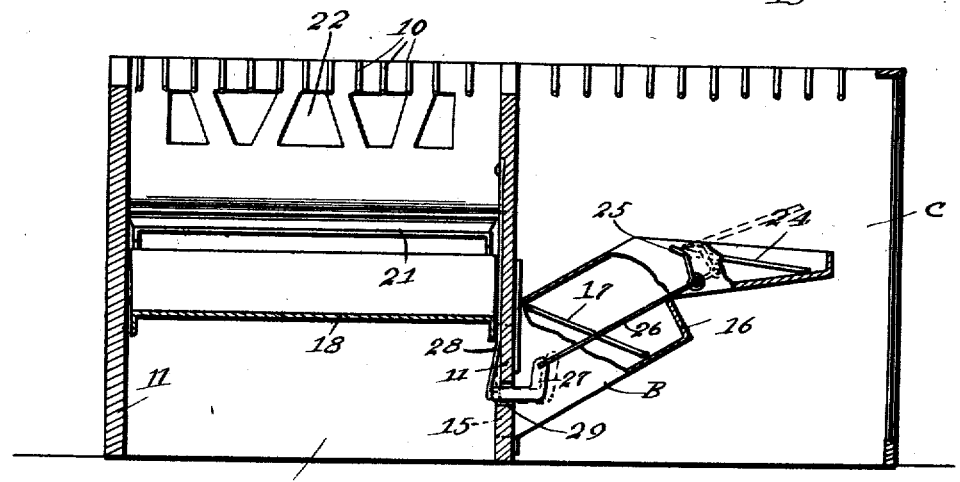
Fig. 3 is a transverse sectional view taken on line 3—3 of Fig. 1.

Referring to the drawings in detail, A indicates a receptacle adapted to be entered by the animal, and from which the animal passes through the chute B into the cage C to be trapped.

The receptacle is preferably of rectangular formation in cross section, embodying a top 10, side walls 11, an end wall 12 and a relatively short bottom 13. While the opposite end of the receptacle is open to admit of the entrance of the animal into the receptacle, a relatively narrow strip 14 extends across said opening, and together with the end wall 12 projects an appreciable distance beyond one side of the receptacle. The cage C is suitably supported between these parts as shown, and one end of the cage is provided with an opening through which the chute B projects into the cage.

The chute establishes communication between the receptacle and the cage, and for this purpose the wall of the receptacle is provided with an opening 15 from which the chute projects. The chute is stepped as shown, the vertical wall or partition 16 dividing the chute into separate sections. In the innermost section of the chute, a pivoted gate 17 is arranged, which is elevated by the animal, as the latter enters the chute, and when the animal passes from the innermost section, the gate 17 gravitates to normal position, which obviously prevents the return of the animal from the chute through the receptacle.

Figure 4:
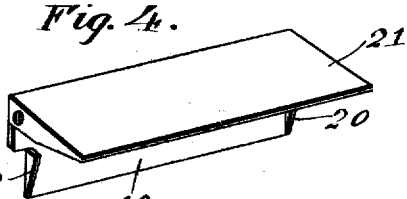
Fig. 4 is a detail view of the trigger for the pivoted platform.

A platform 18 is pivoted intermediate its ends to the side walls 11 of the receptacle, and is normally supported in a substantially horizontal position by means of the trigger illustrated in Fig. 4. The trigger is pivoted between the walls 11 at a point adjacent the end wall 12, and is substantially of inverted L-shaped formation in cross section. Extended from a depending wall 19 of the trigger are projections 20 which support the adjacent end of the platform 18 normally. The opposite end of the platform rests upon the transverse strip 14. When the parts are thus positioned the horizontal wall 21 overlies the adjacent end of the platform 18, and is adapted to be depressed by the weight of the animal, to effect a release of the platform. Disposed within the receptacle adjacent the end wall 12, and at a point immediately above the trigger, is a compartment 22 for the reception of bait, the front wall of the compartment being perforated or otherwise cutaway so that the bait may be viewed by the animal and attract the latter, so that in an effort to obtain the bait, the animal will tread upon the horizontal wall 21 of the trigger.

In practice, the animal enters the receptacle through one end thereof which is of course open for this purpose, and walks upon the platform 18 in the direction of the bait chamber 22. As the animal treads upon the horizontal wall 21, of the trigger, the latter is moved upon its pivot in a direction to throw the depending wall together with its projections out of engagement with the adjacent end of the platform 18. This end of the platform being weighted, drops immediately upon its release by the trigger, thus causing the platform to assume an inclined position, thus closing the entrance opening thereto. In the normal position of the platform, the opening 15 communicating with the chute B is covered, but when the platform swings upon its pivot to an inclined position, the opening 15 is uncovered. The animal, in an effort to escape from the receptacle passes through the opening 15 into the chute, and as the animal enters the chute, the gate 17 is elevated as this gate is freely pivoted within the chute. As the animal passes beyond the gate 17, the latter gravitates to normal or closed position, thus preventing the return of the animal from the chute into the receptacle.

Adjacent the outer extremity of the chute, is a pivoted gate 24 having a crank arm 25 connected to the adjacent end of an operating rod 26, the latter end of this rod being terminally secured to the offset extremity 27 of a resilient element 28. The element 28 has one end secured to the wall 11 of the receptacle and is arranged vertically, the element being slightly spaced from said wall and having its offset extremity 27 movable through a slot 29 in said wall 11. Now, when the platform 18 assumes its inclined position, one edge of the platform is engaged by the resilient element and held thereby in the position mentioned. However, when the platform moves into engagement with the resilient element the gate 24 is slightly elevated or partly opened. As the animal passes through the chute into the cage C, the animal again or further elevates the gate 24, which movment of the gate exerts a pull upon the rod 26, which in turn moves the resilient element in close proximity to the wall 11 out of engagement with the platform 18, permitting the latter to automatically turn to its normal position. The trap is then reset automatically for a second operation.

While it is believed that from the foregoing description, the nature and advantages of the invention will be better understood, I desire to have it understood that I do not limit myself to the exact construction disclosed, and that such changes may be resorted to when desired as fall within the scope of what is claimed.

What is claimed is:—

A trap comprising a receptacle having an entrance opening, a platform pivoted therein, a bait compartment, a cage, a chute establishing communication between the receptacle and cage, a gate freely pivoted within said chute and normally closed, a leaf spring secured to one wall of the receptacle, and arranged at right angles to said platform to engage and hold the latter in an inclined position, a second mentioned gate pivoted within said chute, a rod connecting said gate with the free end of said leaf spring whereby the latter is moved by the opening of the gate to release the platform and allow the latter to assume its normal position.

In testimony whereof I affix my signature.

MARK M. SHIELDS.